US006874013B2

(12) United States Patent
Duranton

(10) Patent No.: US 6,874,013 B2
(45) Date of Patent: Mar. 29, 2005

(54) DATA PROCESSING ARRANGEMENT AND MEMORY SYSTEM

(75) Inventor: Marc Duranton, Boissy Saint Leger (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/316,560

(22) Filed: May 24, 1999

(65) Prior Publication Data

US 2002/0156963 A1 Oct. 24, 2002

(51) Int. Cl.[7] .......................... G06F 15/16; G06F 12/00

(52) U.S. Cl. ....................... 709/213; 711/149; 711/168; 711/157; 711/5

(58) Field of Search .......................... 709/213; 711/149, 711/168, 5, 157

(56) References Cited

U.S. PATENT DOCUMENTS 4,694,426 A * 9/1987 Mason ........................ 365/78
4,698,753 A * 10/1987 Hubbins et al. ............ 709/209
4,734,850 A * 3/1988 Torii et al. .................. 711/169
4,930,066 A 5/1990 Yokota ....................... 711/149
5,027,330 A * 6/1991 Miller ........................ 365/239
5,261,064 A * 11/1993 Wyland ...................... 711/211
5,371,877 A * 12/1994 Drako et al. ................ 711/109
5,696,940 A * 12/1997 Liu et al. .................... 711/154
5,852,608 A * 12/1998 Csoppenszky et al. ...... 370/465
6,263,410 B1 * 7/2001 Kao et al. ................... 711/156

* cited by examiner

*Primary Examiner*—Reginald G. Bragdon
(74) *Attorney, Agent, or Firm*—Michael J. Uve

(57) ABSTRACT

A data processing arrangement (1) comprises a first processor (PROC1) for providing successive sets of input data, a second processor (PROC2) for receiving successive sets of output data and a memory system (2) comprising a plurality of memory circuits (MEM) for storing the input and output data. According to the invention, the data processing arrangement further comprises a master controller (MCP) for setting up memory system by means of control commands (CC) associated with a set of input data and a set of output data. These control commands are received in the memory system by a control unit (MCU). When a data (Di) from the set of input data is provided by the first processor, this control unit selects, on the basis of the control commands, a first memory circuit and generates a write-address (AD_W) in said first memory circuit. In the same way, when a data (Do) from the set of output data is required by the second processor, the control unit, on the basis of the control commands, selects a second memory circuit and generates a read-address (AD_R) in said second memory circuit. Thus, there is no need for the processors to provide addresses when they require or send data therefore leading to a simple data processing arrangement.

5 Claims, 4 Drawing Sheets

1
MCP
PROC1
6
NXT_W
Di
Di
3
MCU
7
NXT_W
2
CNT_W
AD_W
MS
CC
CTRL
R/W
MB
AD_R
CNT_R
8
NXT_R
4
Do
CB
5
NXT_R
Do
PROC2

DATA PROCESSING ARRANGEMENT AND MEMORY SYSTEM

FIELD OF THE INVENTION

The present invention concerns a data processing arrangement comprising a first processor for providing successive sets of input data, a second processor for receiving successive sets of output data and a memory system comprising a plurality of memory circuits for receiving the successive sets of input data and providing the successive sets of output data.

The invention also relates to a memory system, which may receive data and provide data to several processors, and to a method of processing data carried out in such a data processing arrangement. The invention is particularly relevant for applications related to Multimedia involving streams of data.

BACKGROUND ART

The American U.S. Pat. No. 4,930,066 discloses a memory system comprising a plurality of data input/output ports for providing page addresses, a plurality of memory banks for storing pages of data and a switching network for rotating connections between the data input/output ports and the memory banks. An address is transmitted to the memory system in association with the data. The described system comprises therefore, for each input/output port an interface for receiving the data and the associated address. This results in delays when storing data. Moreover this interface is complex in terms of hardware. Besides a memory bank is accessible for either reading or writing but not both. A memory access conflict may occur when a memory bank is selected for both receiving a data to be written and providing a data to be read. The configuration described here is prone to conflicts when two different ports need to access two pages located in the same bank.

SUMMARY OF THE INVENTION

It is an object of the invention to provide a data processing arrangement as defined in the opening paragraph that allows a greater simplicity.

According to the invention, such a data processing arrangement comprises a master controller for setting up the memory system by means of control commands, associated with a set of input data and a set of output data, and the memory system further comprises a control unit for, on the basis of the control commands, selecting a first memory circuit and generating a write-address in said first memory circuit when a data from the set of input data is provided by the first processor, and for, on the basis of the control commands, selecting a second memory circuit and generating a read-address in said second memory circuit when a data from the set of output data is required by the second processor.

The control commands, which are associated with a set of input data and a set of output data, set up the memory system so that it autonomously generates addresses for the data of the two sets. The control unit in the memory system calculates internally these addresses of the input and output data and selects itself a memory circuit for each data. Thus, there is no need for a processor to transmit addresses for providing or receiving data. In fact, a processor does not need to know anything from the internal behaviour of the memory system when it requires or provides sets of data. As a result, any communication protocol that may exist between a processor and such a memory system and the resulting hardware implementation are greatly simplified comparing to the prior art.

Another advantage of the invention relates to the following aspects. In a data processing arrangement in accordance with the invention, the memory system may receive an input data from the first processor and, at the same time, it may provide an output data to the second processor. The control unit allows to counter access conflicts by selecting two different memory circuits for the input and output data. This prevents that stored data are corrupted. A memory circuit may, also, be of a type which allows, at a given instant, either reading or writing but not both. Such memory circuits are relatively cheap and thus another advantage of the invention is cost-efficiency.

The read and write-addresses may be generated in different ways. A possible way of getting these addresses is to load lookup tables with all the addresses associated with the set of input data and the set of output data. These lookup tables are, however, complex to implement and require a great chip area.

A preferred embodiment of the present invention, comprises a read counter and a write counter for generating the read and write addresses, which determine where a data is to be stored or taken, respectively. Those two counters are a simple implementation of means for providing the read-address and write-address.

There also various manners for the memory system to know when a data from the set of input data is provided by the first processor and when a data from the set of output data is required by the second processor. A solution may be that the two counters mentioned hereinbefore count on unit up or down in response to the clock pulse of a clock signal. This implies that the input and output data are received or provided at the fixed rate determined by the clock signal.

Another embodiment of the invention introduces a read and a write-signal from the processors. A processor sends a read or a write-signal to the memory system when it requires a new output data or when it provides a new input data. These signals allow the processors to receive or provide data asynchronously. In this embodiment of the data processing arrangement, the two processors can access the memory system at their own speeds. This is particularly advantageous if various processors have their own processing speeds and, in this case, if they cannot receive or provide data at the same rate. Comparing to the solution where the data are transmitted in response to a clock signal, the embodiment has the main advantage of greater flexibility.

The invention also relates to a memory system comprising a plurality of memory circuits for receiving successive sets of input data and for providing successive sets of output data, wherein the memory system further comprises a control unit being programmable by means of control commands associated with a set of input data and a set of output data and, on the basis of these control commands, for selecting a first memory circuit and generating a write-address in said first memory circuit, when a data from the set of input data is received, and for selecting a second memory circuit and generating a read-address in said second memory circuit, when a data from the set of output data is provided. The invention more generally concerns a method of processing data that is, possibly, carried out in the claimed data processing arrangement.

BRIEF DESCRIPTION OF THE DRAWINGS

The particular aspects of the invention will now be explained with reference to the embodiments described hereinafter and considered in connection with the accompanying drawings, in which.

DETAILED DESCRIPTION OF THE INVENTION

Figure 1:
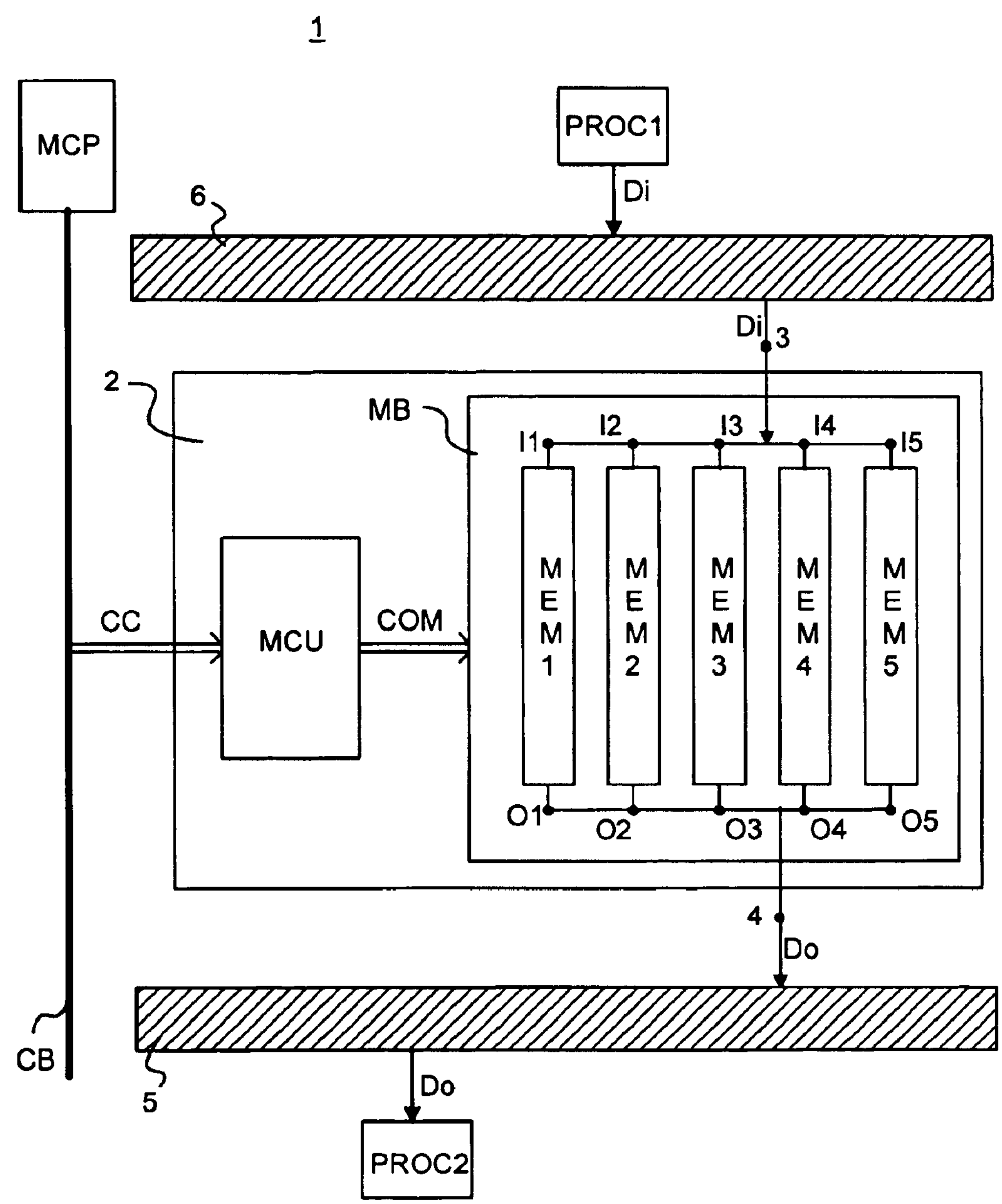
FIG. 1 is a block diagram of an embodiment of a data processing arrangement in accordance with the present invention.

A data processing arrangement 1, in accordance with the invention, is shown in FIG. 1. It comprises a memory system 2, a first processor PROC1 for providing successive sets of input data to the memory system 2 and a second processor PROC2 for receiving successive sets of output data from the memory system 2. PROC1 provides a data Di through a crossbar 6 and an input port 3 of the memory system 2. PROC2 receives a data Do through a crossbar 5 and an output port 4 of the memory system 2. The memory system 2 comprises a memory control unit MCU and a memory block MB. This memory block MB, where data are physically stored, is composed of an arbitrary number, five here, of independent memory circuits MEM1, MEM2, MEM3, MEM4 and MEM5. These memory circuits may, in a preferred embodiment of the invention, for example be SRAM (Static Random Access Memory) of 256 words of 10 bits. Each memory circuit MEM1, . . . , MEM5 is accessible, when a data Di has to be written into it, through a respective input port I1, I2, I3, I4 or I5 and is accessible, when data Do has to be read from it, through a respective output port O1, O2, O3, O4 or O5.

The data processing arrangement 1 further comprises a master controller MCP, which through a control bus CB transmits control commands CC to the control unit MCU. These control commands CC are associated with a set of input data received from PROC1, which have to be written in the memory block MB. These control commands are also associated with a set of output data required by PROC2 and which have to be taken from the memory block MB. The commands CC are transmitted to the control unit MCU before the process of the set of input data and the process of the set of output data by PROC1 and PROC2, respectively. The commands CC operate a setup of the control unit MCU. The control unit MCU has for main function in the memory system 2, the management of the storing of data within the memory block MB. In response to these control commands, the unit MCU is able to generate a set of commands COM transmitted to the memory block MB, indicating where to take a data Do from MB or where to put a data Di into MB. Thus, when a data Di is provided in port 3 by PROC1 for being written, the MCU transmits to the memory system 2 the set COM indicating, firstly, in which memory circuit MEM1, MEM2, MEM3, MEM4 or MEM5 the data Di has to be written by activating the corresponding input port I1, I2, I3, I4 or I5. This set COM also comprises a write-address, where the data has to be written in the selected memory circuit. Similarly, when a data Do is required by PROC2 at the output port 4, the MCU sends a set COM indicating to the memory block MB which memory circuit MEM is selected and comprising a read-address within this memory circuit, where the required data is to be taken from.

It is to be noted that a write and a read operation cannot be performed simultaneously in the same memory circuit. Indeed, in order not to corrupt data that are required simultaneously for reading and writing, both operations are not allowed at the same time. When a same memory circuit is selected for simultaneous reading and writing, the read operation is inactivated and the write operation is performed normally. Simultaneous read and write operations can only be performed in two different memory circuits. As a result access conflicts are resolved in a data processing arrangement in accordance with the invention. It will be shown in further detail in a paragraph hereinafter, how access conflicts, that may occur are detected and avoided.

The memory block may be used in association with several processors. However two processors can not simultaneously access the memory system 2 for writing. Several units may, however simultaneously access the memory block MB for reading a same set of data through 4. A memory block, such as described here, is often used as a buffer memory between two processors in a processing chain.

Figure 2:
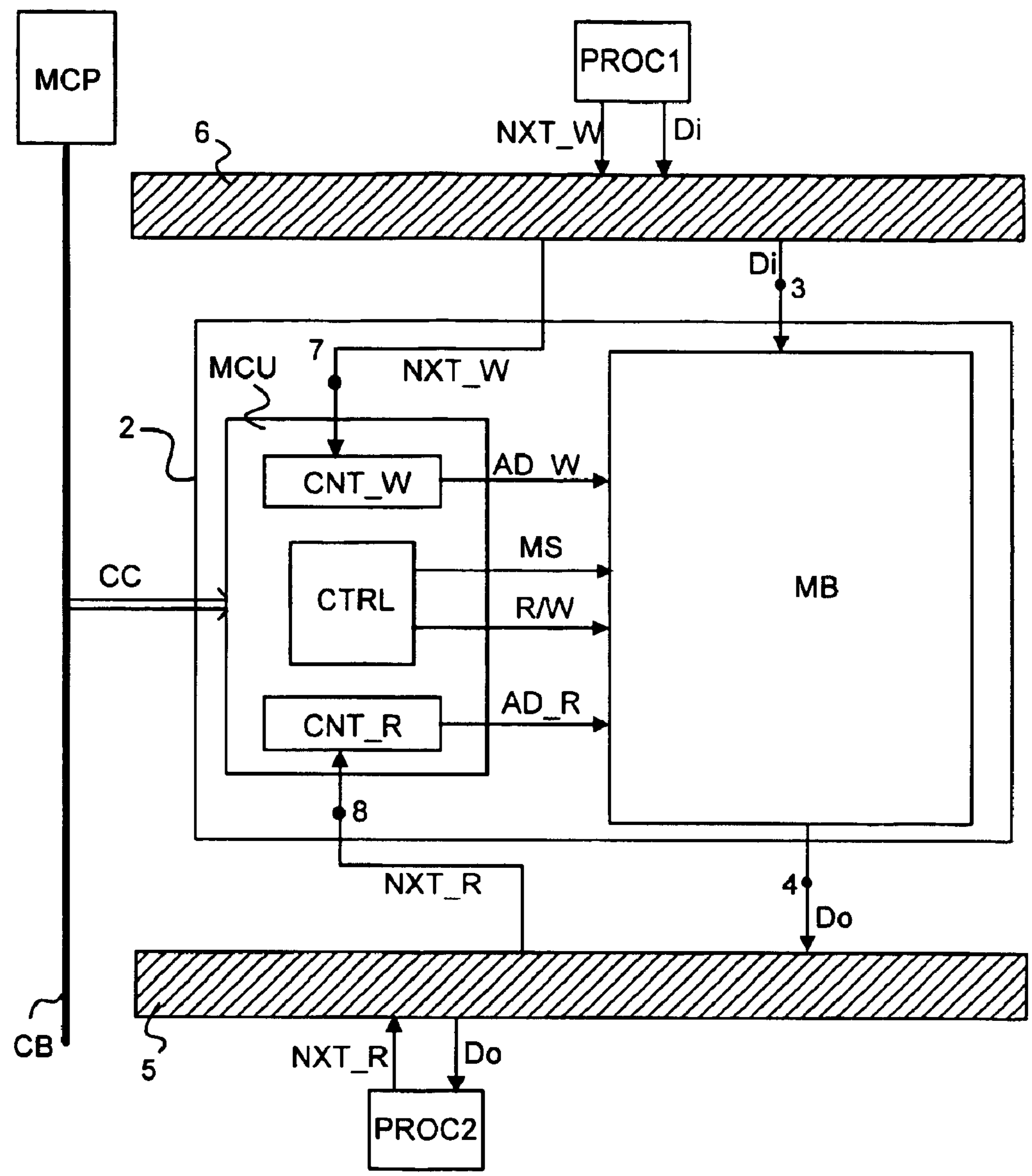
FIG. 2 is a block diagram of a preferred embodiment of a data processing arrangement in accordance with the invention.

In a preferred embodiment of the invention, the control unit MCU, shown in FIG. 2, transmits the set of commands COM composed of four signals: MS, R/W, AD_W and AD_R. Besides, in this preferred embodiment, the control unit MCU comprises a controller CTRL, which after setup by means of the control commands CC, transmits, when a data is to be read or written, the signal MS to the memory block MB. This signal MS transmitted allows the selection of a memory circuit MEM1, MEM2, MEM3, MEM4 or MEM5. The controller CTRL further transmits to the memory block MB the R/W signal, which indicates whether the selected memory circuit is required for reading or writing and, which allows the activation of its input port I1, . . . , I5 or output port O1, . . . , O5 depending whether the memory circuit is selected for reading or writing. This signal may for example be 1 when the selected memory circuit is required for writing and 0, when it is required for reading.

The memory control unit MCU further comprises two internal counters CNT_R and CNT_W, that can be externally loaded. The value of the counter CNT_W is modified in response to a signal NXT_W received through a write-input port 7 of the control unit MCU and provides the signal AD_W, which is the write-address of the data Di to be written in the memory circuit selected by the controller CTRL. Thus, when the processor PROC1 provides Di, it also sends the signal NXT_W through the crossbar 6 and the write-input port 7. Di is written in the memory circuit selected by the controller CTRL at the location within this memory circuit indicated by AD_W. The counter CNT_W is then incremented in response to NXT_W and is ready to provide a new address AD_W indicating the next available location for a next data Di provided by PROC1. The signal NXT_W permits therefore to increment the addresses within the selected memory circuit for a continuous and asynchronous writing of the data of Di. The counter CNT_W is, in this embodiment of the invention, incremented after the data is written into the selected memory circuit. CNT_W may also be decremented in response to NXT_W and before the data is written.

In the same way, when PROC2 requires a new data Do from the memory block MB, it sends a signal NXT_R through the crossbar 5 and a read-input port 8 of the control unit MCU to the counter CNT_R. The counter CNT_R, in response to NXT_R increments and provides a read-address AD_R to MB. This address AD_R is the address of the data Do required by PROC2 within the memory circuit selected for reading by the controller CTRL. The counter CNT_R is incremented before the data is taken from the selected memory circuit. In an embodiment of the invention, the signals NXT_W and NXT_R are provided to the respective clock inputs of the counters and function therefore as asynchronous clocks for the counters CNT_W and CNT_R, respectively. A main advantage of this preferred embodiment is the asynchronous behaviour of the data processing arrangement 1, allowing the memory system to be accessed by processors of different processing speed. In a possible implementation of the invention the two counters are connected to a clock signal and provide, for example, the read and write-addresses at each rising edge of the clock signal. This implementation requires a synchronous behaviour of the processors, which have to receive and provide data at the fixed frequency of the clock.

Figure 3:
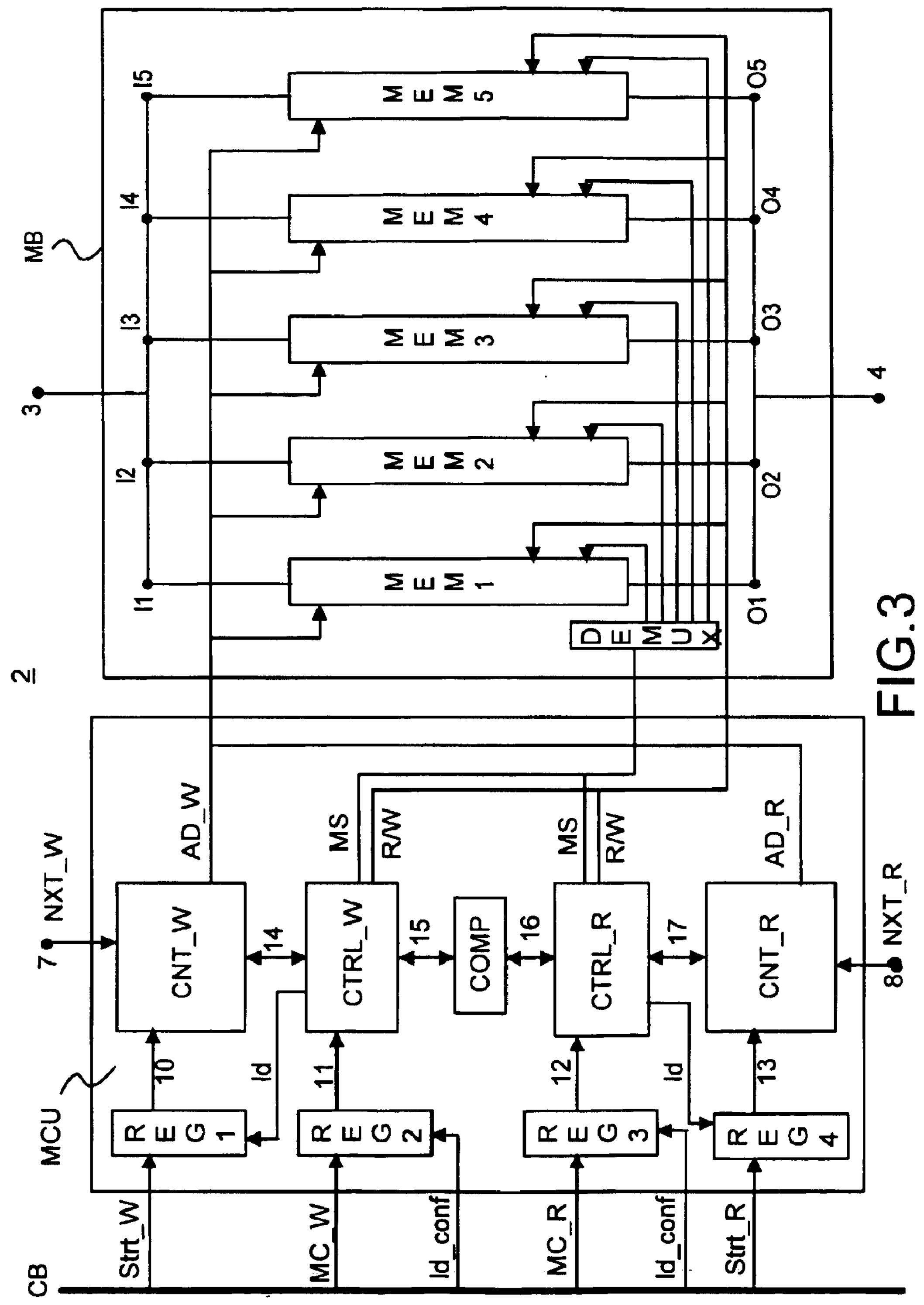
FIG. 3 is a block diagram of a memory system showing the internal connections among its various components.

An improved embodiment of the invention is depicted in FIG. 3. It is shown a memory control unit MCU comprising the two counters CNT_W and CNT_R of FIG. 2. The controller CTRL described in FIG. 2 is, in this improved embodiment of the invention, composed of two internal separate controllers CTRL_W, CTRL_R and a separate unit COMP for detecting and solving the access conflicts that may occur within the memory system 2. The control unit MCU is also constituted of four registers REG1, REG2, REG3 and REG4. These registers receive the set of control commands CC from the master controller MCP. This set CC is here constituted of four main command words: Strt_W, MC_W, MC_R and Strt_R. The commands MC_W and MC_R are stored in REG2 and REG3, respectively, in response to a load signal ld_conf transmitted on the control bus CB from the master controller MCP. Strt_W and Strt_R are loaded in REG1 and REGG4, respectively, in response to a ld signal from the controllers CTRL_W and CTRL_R, respectively. The content of REG1 is transmitted to the counter CNT_W via a connection line 10. The content of REG2 is transmitted to the controller CTRL_W via a connection line 11. The content of REG3 is transmitted to the controller CTRL_R via a connection line 12. And the content of REG4 is transmitted to the counter CNT_R via a connection line 13. This ld_conf signal, transmitted on the control bus CB, activates the setup of the memory control unit MCU. Indeed, in response to this signal ld_conf the contents of the registers REG2, REG3 are updated with the new control commands CC received on the control bus CB.

The memory block shown in FIG. 3 is symmetrical considering that an upper part of the memory block concerns the write function of the memory block and that a symmetrical lower part concerns the read function of the memory block. The description hereinafter is mainly focused on the elements of the memory block related to the write function but what is said for these elements is also valid for the symmetrical elements related to the read function.

Figure 4:
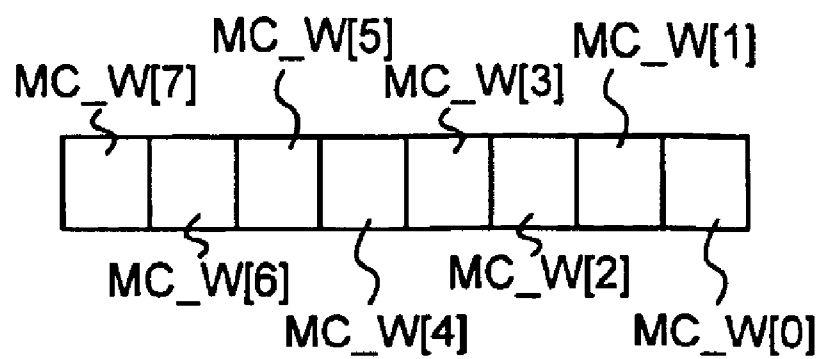
FIG. 4 depicts the 8-bits word MC_W.

Strt_W, MC_W, MC_R and Strt_R may be 8-bits words for which the bits have the meanings described hereinafter. The signals MC_R and MC_W, respectively, define a read pattern for a read processing cycle and a write pattern for a write processing cycle. A processing cycle starts with a new set of control commands CC loaded in the controllers CTRL_W, CTRL_R during the setup phase. The exact meaning of each bit in the 8-bits word MC_W, shown in FIG. 4, is explained as follows:

The least significant bit, MC_W[0], indicates if a write operation is enabled. When this bit is set to "1", the write operation is allowed, when set to "0", the write operation is inactivated, the counter CNT_W is not incremented and the other bits of MC_W are ignored.

MC_W[1] and MC_W[2] select the write operation pattern among four possible patterns. Table 1 defines a code memorized in the internal controller CTRL_W that gives a pattern for the write operation.

TABLE 1

| MC_W[2] | MC_W[1] | Write pattern |
|---|---|---|
| 0 | 0 | Reset of CNT_W (i.e. AD_W = 8b0) via line 14 |
| 0 | 1 | Start the write operation from the address given by Strt_W, loaded in REG1 in response to the signal Id from CTRL_W |
| 1 | 0 | Continue the write operation from the current address, including the current memory circuit |
| 1 | 1 | Continue from the current address and from the memory circuit indicated by MC_W[3], MC_W[4] and MC_W[5] |

MC_W[3], MC_W[4] and MC_W[5] indicate the value of the starting memory circuit number for writing during the writing cycle. In this embodiment of the invention the memory block MB comprises five independent memory circuits, the number of a memory circuit, which goes from 1 to 5, is in this case binary encoded in 3 bits.

MC_W[6] is unused.

The most significant bit, MC_W[7], indicates a need for change in the memory circuit number during the write cycle. When this bit is set to "0" then the memory circuit number is automatically incremented when the 8-bits address counter CNT_W goes from the beginning of a memory circuit to the end. If the memory circuit number is equal to the maximum, here 5, then the memory circuit number, coded in MC_W[3], MC_W[4] and MC_W[5] is set to 1. The controller CTRL_W has access to the current value of CNT_W for checking through the connection line 14. When this bit is set to "1", the memory circuit number coded in MC_W[3], MC_W[4] and MC_W[5] is not changed during the write cycle.

A similar description is also valid for the 8-bits word MC_R. Its bits have the same signification as the bits of MC_W, for a read processing cycle this time. Thus, the controller CTRL_R checks and resets the value of CNT_R through a connection line 17 and allow the counter CNT_R to load a new value in response to a command ld.

An access conflict may occur when a memory circuit selected for a read operation is the same as the memory circuit selected for a write operation, i.e. MC_W[3]=MC_R[3]=MC_R[3], MC_W[4]=MC_R[4], MC_W[5]=MC_R[5]. A conflict is real when, in addition, the write and read operations are both enabled, i.e. MC_W[0]=1 and MC_R[0]=1. The unit COMP receives from CTRL_W the bits MC_W[0], MC_W[3], MC_[4], MC_W[5], transmitted on 15, and from CTRL_R the bits MC_R[0], MC_R[3], MC_R[4], MC_R[5], transmitted on 16. The unit COMP compares bit-by-bit the bits received and when it detects a real memory access conflict (the memory circuits numbers selected for reading and writing are the same and the read and write operations are both enabled) it makes, through 16, the bit MC_R[0], which tells if the read operation is enabled, to be read as a 0 by CTRL_R. In fact, the unit COMP does not exactly modify MC_R[0], which stays at 1 but it makes it be read as a 0 by the controller CTRL_R. The conflict stops either because one of the read and write operation is disabled during a new setup phase or either because the number of the memory circuit to be accessed for reading or writing is modified during a new setup or within the course of the read or write operation. In such a case the unit COMP does not detect further conflict and the write operation is performed normally.

Let it be considered that a data Di needs to be written within the memory system 2. Di is provided in port 3 and at the same time CTRL_W and CNT_W transmit their respective signals MS, R/W and AD_W. The MS signal is, for example, the three coded bits representing the memory circuit number to be selected. This signal is transmitted to a demultiplexer DEMUX, whose outputs are connected to each memory circuit MEM. The demultiplexer DEMUX transmits a 1 to the memory circuit, whose number is coded in MS and transmits a 0 to all the other memory circuits. The R/W signal is transmitted to all the memory circuits but is only taken into account by the selected memory circuit and also results in the activation of the input port of the memory circuit for the writing of Di. The write-address AD_W is, as well, transmitted to all the memory circuits but, again, is only taken into account by the selected memory circuit. The data is then transmitted in the memory block towards the activated input port and to the indicated location within the selected memory circuit.

In an ameliorated embodiment of the invention, the memory system 2 may send a signal to indicate to the processors if it is ready to receive or provide data. This would prevent a processor to access the memory for reading when it is empty or for writing when it is already full.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements or all functional elements as a single physical unit.

What is claimed is:

1. A data processing arrangement comprising:

a first processor for providing successive sets of input data;

a second processor for receiving successive sets of output data;

a memory system including a plurality of memory circuits where all of the plurality of memory circuits are accessible by the first processor for writing and all of the plurality of memory circuits are accessible by the second processor for reading;

a master controller for setting up the plurality of memory circuits of said memory system using control commands associated with a set of input data and a set of output data; and a control unit including at least two counters that can be externally loaded with variable, non-zero values, respectively, by signals from the first and second processors, the control unit, on the basis of the control commands and the signals, controls access to the memory system by the first and second processor in an asynchronous manner;

wherein at least one of the first processor and the second processor accesses the memory circuits through a crossbar.

2. A data processing arrangement, as claimed in claim 1, wherein the at least two counters includes:

a write-counter whose value is modified in association with the data received from the set of input data and which value indicates the write-address of the data in the first memory circuit; and a read-counter whose value is modified in association with the data provided from the set of output data and which value indicates the read-address of the data in the second memory circuit.

3. A data processing arrangement, as claimed in claim 1, wherein the control unit includes a write-input port for receiving a write-data signal from the first processor in response to which the control unit generates e write-address and the control unit further comprises a read-input port for receiving a read-data signal from the second processor in response to which the control unit generates the read-address.

4. A memory system comprising:

a plurality of memory circuits for receiving successive sets of input data and for providing successive sets of output data, all of the plurality of memory circuits being accessible by at least one processor for writing and by at least another processor for reading;

a control unit including at least two counters that can be externally loaded with variable, non-zero values, respectively, by signals from the at least two processors, and being programmable by means of control commands and the signals, and a comparator for preventing the at least one processor for writing and the at least another processor for reading from accessing an identical respective one of the plurality of memory circuits simultaneously, controls access to the plurality of memory circuits by the at least two processors in an asynchronous manner;

wherein at least one of the processors accesses the memory circuits through a crossbar.

5. A method of processing data in a data processing arrangement including a first processor for providing successive sets of put data, a second processor for receiving successive sets of output data and a memory system including a plurality of memory circuits that are all accessible by the first processor for providing the successive sets of input data and by the second processor for receiving the successive sets of output data, the method comprising, for a set of input data and a set of output data, the following steps:

a configuration step in which the memory system is setup by means of control commands associated with the set of input data and the set of output data, the control commands selecting amongst a plurality of predefined addressing options;

a counter set-up step in which at least two counters receive set-up signals, respectively, from the first and second processor; and an execution step in which, on the basis of the control commands and the step-up signal, the memory system:

controls access to the plurality of memory circuits by the first an second processors in an asynchronous manner;

wherein at least one of the first processor and the second processor accesses the memory circuits through a crossbar.

* * * * *